Feb. 21, 1956  A. C. FIELDS  2,735,509
ELECTROSTATIC PRECIPITATOR
Filed April 1, 1953
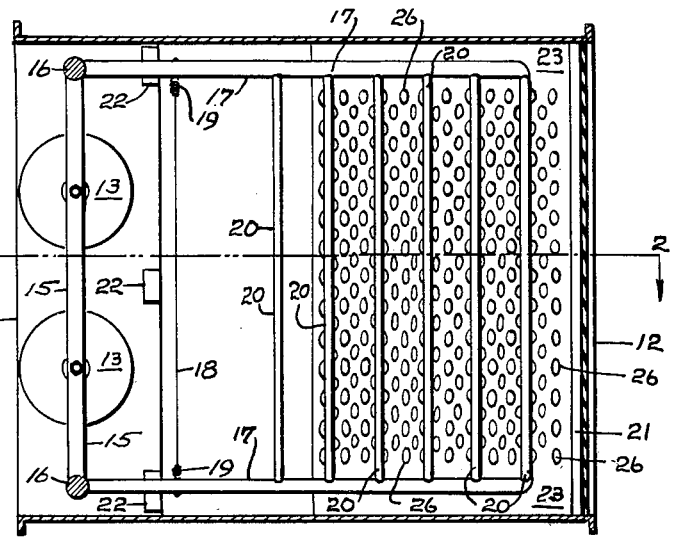
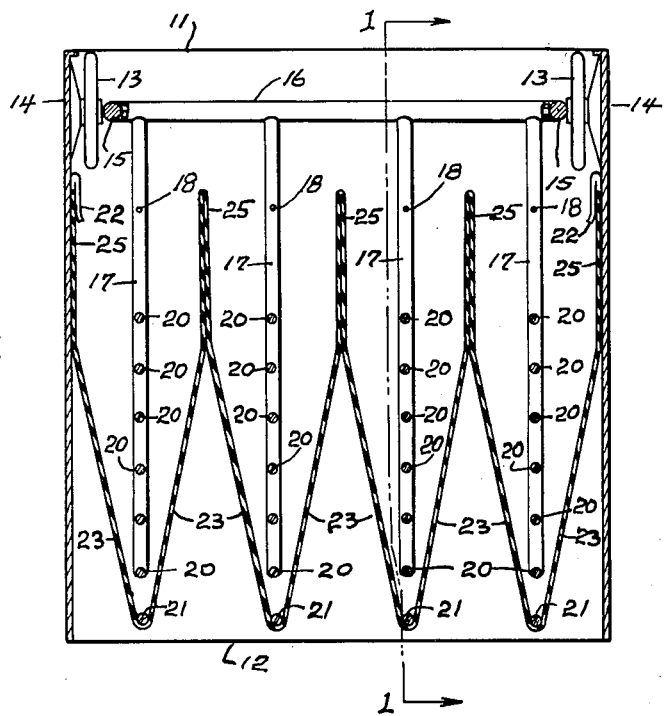
INVENTOR.
ARNOLD C. FIELDS
BY Robert J. Palmer
Attorney United States Patent Office 2,735,509
Patented Feb. 21, 1956

2,735,509

ELECTROSTATIC PRECIPITATOR

Arnold C. Fields, Medfield, Mass., assignor to Westinghouse Electric Corporation, East Pittsburgh, Pa., a corporation of Pennsylvania Application April 1, 1953, Serial No. 346,133

7 Claims. (Cl. 183—7)

This invention relates to electrostatic precipitators for removing small foreign particles such as dust from gases such as air.

The electrostatic precipitators most widely used for cleaning air employ collector chambers having closely spaced, metal collector plates. Such plates are efficient collectors but are difficult to clean after they have become loaded with collected matter.

This invention provides a combined ionizer and collector electrode for an electrostatic precipitator which can be easily removed from a precipitator for cleaning or replacement. It is so economical in cost that it can be disposed of after use, and replaced with a new one.

In one embodiment of the invention, a plurality of fixed grids of charged metal rods extend between the sides of a plurality of V-shaped, perforated sheets having conductive surfaces, the sheets are interconnected in zig-zag fashion so they can easily be removed and replaced as a unit. Upstream portions of the sheets extend on opposite sides of ionizer wires and form non-discharging ionizer electrodes. Downstream portions of the sheets form collector electrodes, precipitating fields being produced between their conductive surfaces and the charged metal rods of the grids. The dust in the air being cleaned precipitates on the sheet surfaces around the perforations in the sheets while the clean gas flows through the perforations.

An object of this invention is to provide an inexpensive, easily removable and replaceable collector electrode for an electrostatic precipitator.

Another object of this invention is to provide an inexpensive, easily removable and replaceable combined ionizer and collector electrode for an electrostatic precipitator.

The invention will now be described with reference to the drawing, of which:

Fig. 1 is a side elevation, in section, of an electrostatic precipitator embodying this invention, the section being taken along the lines 1—1 of Fig. 2, and Fig. 2 is a sectional view along the lines 2—2 of Fig. 1.

The rectangular metal casing 10 has an open inlet end 11, and an open outlet end 12. The four electric insulators 13 are attached to the side walls 14 of the casing adjacent its inlet end, and support therebetween a rectangular, high voltage metal frame consisting of the spaced-apart parallel, metal rods 15, and the spaced-apart parallel, metal rods 16 extending perpendicular to the rods 15 and having their ends attached to the ends of the rods 15. The metal rods 17 are attached to the rods 16 and extend perpendicular thereto longitudinally within the casing towards the outlet 12. The ionizer wires 18 are supported by the springs 19 from the rods 17.

The spaced-apart cross rods 20 extend between and are attached to corresponding rods 17 downstream of the wires 18. The metal rods 21 extend between and are attached to opposite casing walls adjacent the outlet 12 of the casing 10, and downstream of the rods 20. The metal clips 22 are attached to the interior surfaces of the casing walls 14 adjacent the ionizer wires 18 but upstream of the wires.

A removable, combined ionizer and collector electrode is formed in zig-zag fashion with a plurality of interconnected V-shaped sheet sections 23, and a plurality of parallel sheet sections 25 located upstream of the V-shaped sections. The upstream ends of the end sections 25 are clamped against the casing walls 14 by the clips 22 for supporting the removable electrode in position in the precipitator. The rods 21 fit within the apices of the V-shaped sections and locate the downstream ends of the removable electrode and help maintain it in its correct position. The removable electrode is inserted within and removed from, the outlet end of the casing.

The removable electrode preferably is formed from cardboard or thick paper having a conductive surface such as a coating of conductive ink such as is used in printed circuits, or such as a metal foil. Its conductive surface is grounded to the casing through the clips 22 and the rods 21. Its V-shaped sheet sections contain the large number of small perforations 26 for permitting the passing of air therethrough.

The sheet sections 25 have upstream portions adjacent the ionizer wires 18 and on opposite sides thereof, which form nondischarging ionizer electrodes. They have downstream portions which, adjacent their connections to the V-shaped sections 23 form collector electrodes.

The cross rods 20 extend mid-way between the collector surfaces of the sheet sections 25, and within the V-shaped sections 23 in line with their apices, and are electrodes for establishing electrostatic fields between themselves and the surfaces of the sheet sections 23 and 25 which act as collector electrodes. The high voltage frame consisting of the rods 15 and 16 would be connected to the plus terminal such as the 12 kv. terminal of a conventional high voltage direct current power source, the negative terminal of which would be grounded to the casing 10. The wires 18 and the cross rods 20 would be charged to 12 kv. through their connection to the high voltage frame.

*Operation*

In operation, the air to be cleaned would be moved by a fan which is not illustrated, first between the ionizer wires 18 and the upstream portions of the sheet sections 25. The air would be ionized and positive electrostatic charges would be given the dust entrained therein. Electrostatic fields would be established between the cross rods 20 and the downstream portions of the sheet sections 25, and the V-shaped sections 23. Some of the charged dust would deposit upon the downstream portions of the sheet sections 25. The dust particles in the outer layers of air nearest the upstream portions of the V-shaped sections 23 would deposit first upon the latter. As the air moves towards the outlet 12, the dust particles precipitate while the clean gas passes through the perforations 26. Successive laminae of air are exposed to increasingly stronger precipitating fields due to the decrease in spacing between the cross rods 20 and the V-shaped sections 23, and for longer time intervals, resulting in the collection of the dust most difficult to collect—that travelling along the centers of the collection zones.

Since the sheets from which the removable electrode is formed preferably would be flexible, the electrode could be compressed for storing or shipment. Its surfaces also, preferably would be coated with a fire-proofing compound which could be an adhesive.

While one embodiment of the invention has been described for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. An electrostatic precipitator comprising means including a pair of spaced-apart, parallel side walls forming a gas passage having a gas inlet at one end and having a gas outlet at the other end, a sheet like electrode member extending from one of said walls to the other and being folded so as to have a plurality of spaced-apart sheet sections extending parallel to said walls and to have V-shaped sheet sections between adjacent pairs of said parallel sheet sections and located between said outlet and said sections, said sections having electrically conductive surfaces, said V-shaped sections diverging towards said inlet and having a plurality of closely spaced relatively small perforations therein, a plurality of ionizer wires supported between said first mentioned sheet sections, and a plurality of spaced-apart metal rod electrodes extending parallel to said side walls and between the sides of said V-shaped sections in alignment with the apices thereof.

2. An electrostatic precipitator as claimed in claim 1 in which longitudinally extending metal rods support said wires and said rod electrodes.

3. An electrostatic precipitator as claimed in claim 2 in which means is provided for supporting the electrode member at its transverse ends from the interior surfaces of said side walls.

4. An electrostatic precipitator as claimed in claim 3 in which a plurality of metal rods are fitted within the apices of said V-shaped sections.

5. An electrostatic precipitator as claimed in claim 1 in which means is provided for supporting the electrode member at its transverse ends from the interior surfaces of said side walls.

6. An electrostatic precipitator as claimed in claim 1 in which a plurality of metal rods are fitted within the apices of said V-shaped sections.

7. An electrostatic precipitator as claimed in claim 6 in which means is provided for supporting the electrode member at its transverse ends from the interior surfaces of said side walls.

References Cited in the file of this patent

UNITED STATES PATENTS

| | | |
|---|---|---|
| 2,443,780 | Wintermute | June 22, 1948 |
| 2,582,133 | Karlsson | Jan. 8, 1952 |
| 2,588,111 | Hanneman | Mar. 4, 1952 |